United States Patent
Massey et al.

(10) Patent No.: US 6,802,919 B2
(45) Date of Patent: Oct. 12, 2004

(54) CONTAINER LID SEALING METHOD

(75) Inventors: Samuel M. Massey, Joiner, AR (US); Richard Phillips, Osceola, AR (US); Victor J. Jodts, Jr., Independence, MO (US); Thomas A. Lord, Lebanon, OH (US)

(73) Assignees: Creative Foods, LLC, Osceola, AR (US); Plastic Enterprise Co., Inc., Lee's Summit, MO (US)

( * ) Notice: Subject to any disclaimer, the term of this patent is extended or adjusted under 35 U.S.C. 154(b) by 216 days.

(21) Appl. No.: 10/135,494

(22) Filed: Apr. 30, 2002

(65) Prior Publication Data

US 2002/0125253 A1 Sep. 12, 2002

Related U.S. Application Data

(62) Division of application No. 09/631,809, filed on Aug. 3, 2000, now Pat. No. 6,460,720.

(51) Int. Cl.[7] .................... B65B 7/28
(52) U.S. Cl. .................... 156/69; 156/155; 156/308.4
(58) Field of Search .................... 156/69, 155, 308.4, 156/196, 219, 308.2; 220/359.1, 214, 359.3, 359.4; 493/102, 103, 104, 108; 53/477, 478, 485, 488

(56) References Cited

U.S. PATENT DOCUMENTS

| 4,044,941 A | * | 8/1977 | Knudsen | 220/258.3 |
| 4,215,797 A | * | 8/1980 | Chen | 220/359.4 |
| 4,605,142 A | * | 8/1986 | Itoh et al. | 220/359.4 |
| 4,659,405 A | * | 4/1987 | Walter | 156/69 |
| 4,738,374 A | * | 4/1988 | Ingemann | 220/258.2 |
| 4,913,307 A | * | 4/1990 | Takata et al. | 220/276 |
| 4,969,965 A | * | 11/1990 | Matty et al. | 156/69 |

\* cited by examiner

*Primary Examiner*—Gladys JP Corcoran
(74) *Attorney, Agent, or Firm*—J. Charles Dougherty

(57) ABSTRACT

A method for sealing a container comprising a cup and lid is disclosed. The cup has a lip with a raised sealing bead along its length. During sealing, the raised sealing bead compresses, thereby stretching the adhesive layer on the lower portion of the lid out of the way and forming a direct welded seal with the heat-resistant layer of the lid. The adhesive to either side of the sealing bead forms an adhesive seal between the lid and the remaining portion of the lip. This type of double seal is particularly effective in forming a durable, consistent seal when product is present on the lip of the container. The welded seal is also well suited to situations when the cup may be warped or the sealing bead is otherwise caused to be higher along some portion of its length than along other portions.

10 Claims, 3 Drawing Sheets

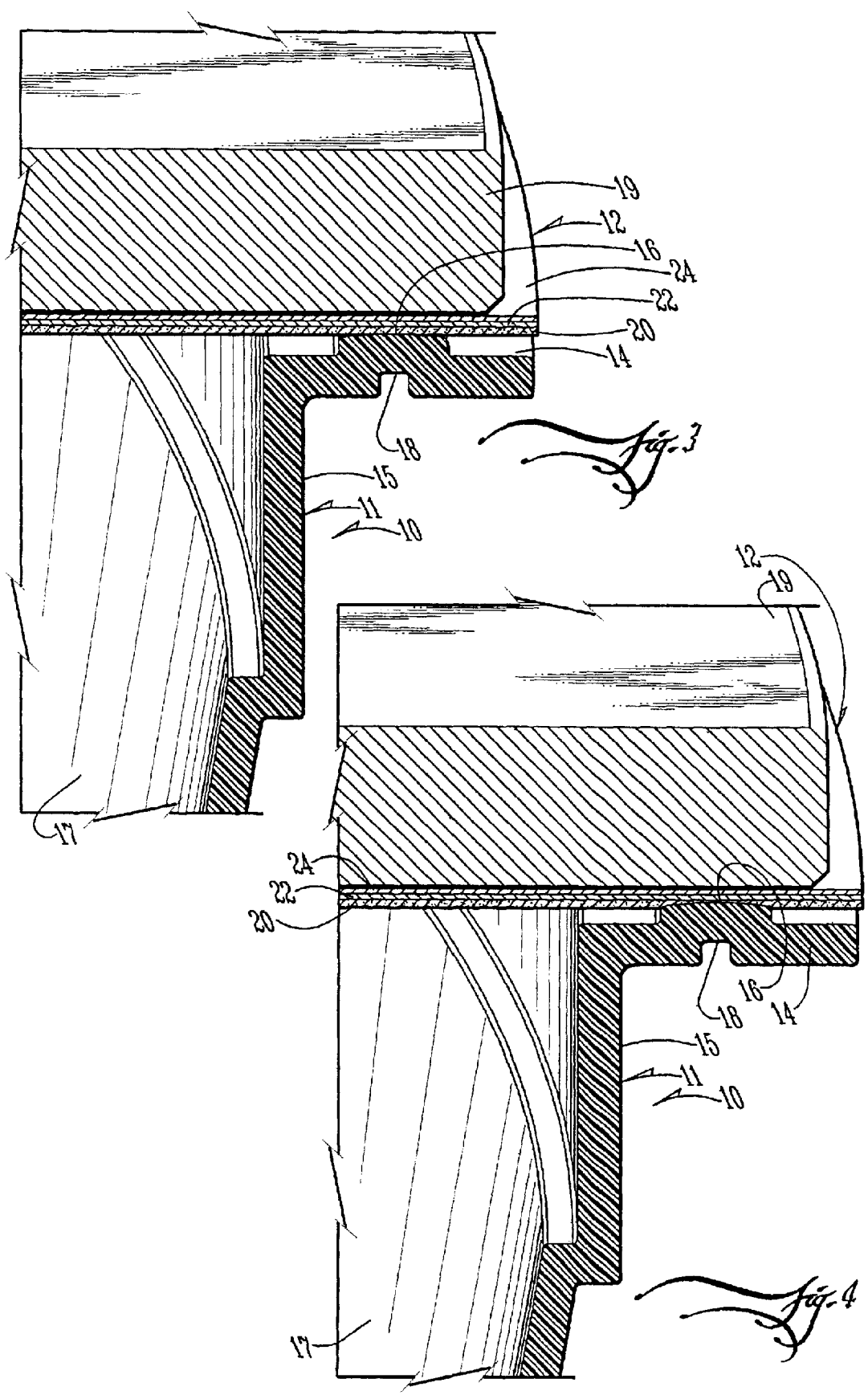

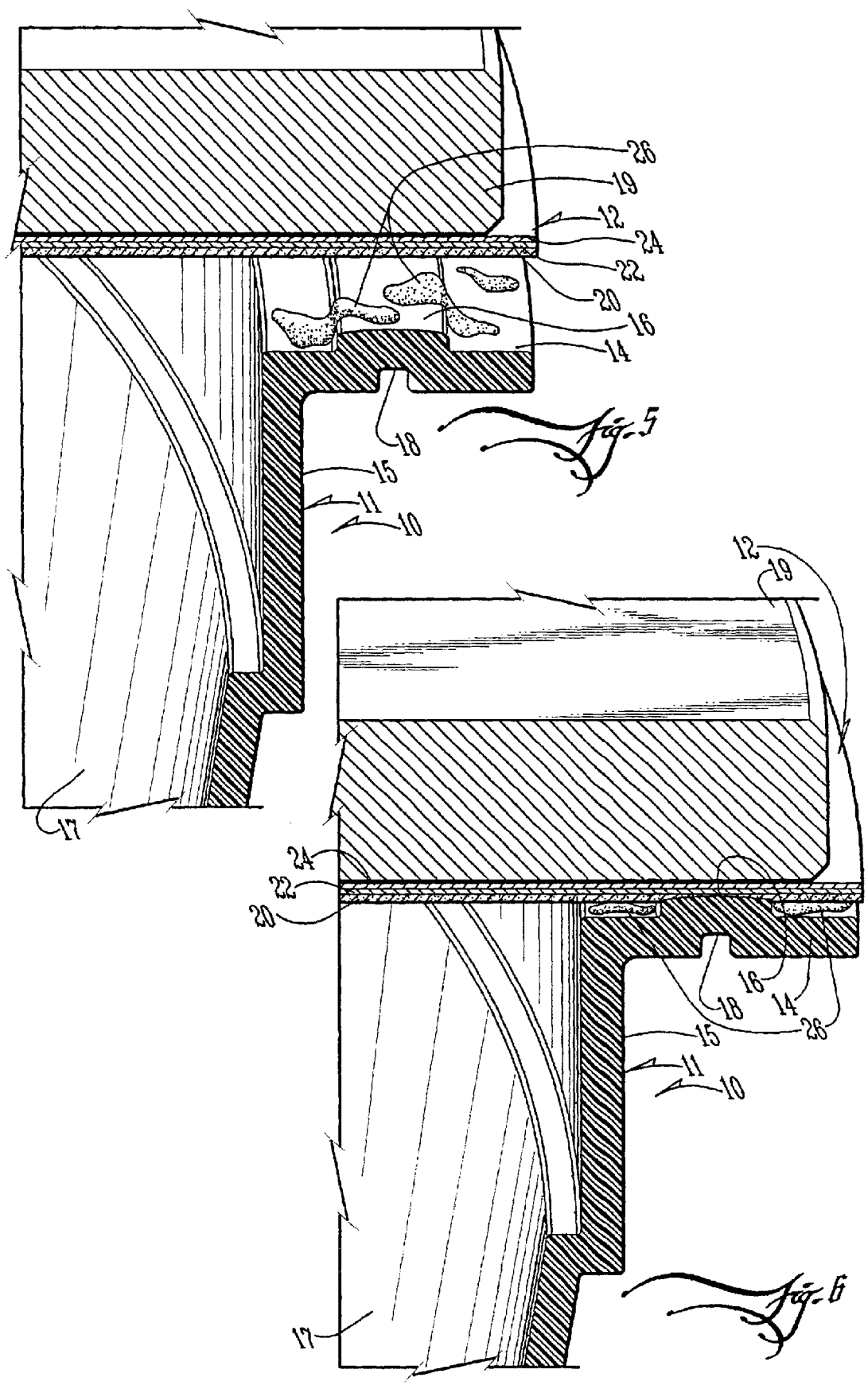

CONTAINER LID SEALING METHOD

This application is a divisional of application Ser. No. 09/631,809, filed on Aug. 3, 2000, now U.S. Pat. No. 6,460,720.

FIELD OF THE INVENTION

The invention relates broadly to a method for sealing containers, and in particular relates to a method for double-sealing a peel-away lid to a container.

BACKGROUND OF THE INVENTION

Many types of food products, both liquid and solid, are packaged in containers with peel-off lids. Such containers are often designed to hold single portions of items such as condiments and toppings, and are thus referred to as "portion cups." Portion cups are commonly found in restaurants and contain such products as margarine, sour cream, and salad dressings. Solid materials that may be packaged in portion cups include ground pepper and various other seasonings. Portion cups are available in various sizes matched to the normal portion of the materials they are designed to contain. The container itself is generally formed of a plastic material, and may be molded in many shapes, including cylindrical, rectangular, and frustoconical varieties.

Portion cups have become popular because they may be produced relatively inexpensively while offering great convenience to the consumer. Such containers may be easily opened without the need for tools or opening devices. Generally, such containers are formed with a lip or flange extending laterally outward from the open top, to which the lid is sealed with some type of adhesive. The lid generally includes a tab or other handhold portion that extends beyond or above the lip. By gripping the tab and pulling back across the top of the lid, the consumer may easily open the container without spilling its contents.

One of the chief difficulties encountered in designing containers with peel-off lids is the maintenance of a consistent seal strength for all such containers produced. Numerous factors may affect the seal strength for the lids of such containers, such as the temperature at which the seal is made, the pressure applied to the lid during the sealing process, and the particular properties of the adhesive used. When a seal is formed that is too strong, the container becomes difficult to open, and may lead to the consumer using a knife or other potentially dangerous methods of reaching the contents inside. If the seal strength is too weak, then the container may leak during shipment or storage. Rough handling during shipment is a common problem for containers of this sort, as they are most often dropped into large boxes in groups of several hundred with no special padding or packaging to protect them from contact with other containers. If a container spills during shipment under these conditions, the entire box of product may be ruined as the contents of one or a few containers spills onto the other containers. Various environmental factors such as temperature and humidity may weaken seal strength during storage even when the seal strength was within specified tolerances at the time of manufacture. Consumers will reject a container that is not properly sealed, and the defect may reflect poorly on the food vendor that offered the product to the consumer.

Still another problem encountered in sealing containers with peel-away lids is that some portion of the packaged product may be present on the lip of the container prior to seating of the lid during the sealing process. Liquids may splash or spill onto the lip of such containers during filling, and powders or granulated materials may settle onto the lip of such containers in the form of a dust. This problem is exacerbated by the high speed at which the filling operation must proceed in order to keep production costs low. When a lid is applied to a container when such material is present on the container's lip, the seal in that region of the lip will be poor and the container is far more likely to leak during shipment or storage.

The prior art includes various attempts to improve the durability and consistency of the lid seal for peel-off lid containers. For example, U.S. Pat. No. 5,316,603 to Akazawa et al. teaches a container having "microdents" along a sealing layer in the flange or lip portion of the container, or along the sealing portion of the lid. These microdents are arranged in various patterns in the form of dots along the sealing surface between the lip and lid of the container.

U.S. Pat. No. 5,979,748 to Drummond et al. teaches a tubular container with a lid having an adhesive layer; the lid is sealed using heat and pressure. As the lid is pressed onto the lip of the container, the adhesive in the adhesive layer is pressed outward from the center of the lip, forming an outer adhesive bead and inner adhesive bead from the adhesive build-up at the edges of the lip. A thin layer of adhesive may remain between the lid and container lip, or the container and lid may make contact in the center of the lip, such that the entire seal is formed by the inner and outer adhesive beads.

U.S. Pat. No. 4,379,008 to Gross et al. teaches a method for attaching together two pieces of cardboard using a heater with truncated pyramid-shaped projections. One piece of the cardboard has an adhesive layer that contacts the other piece. As the heater is pressed onto the upper piece of cardboard, pressure from the projections causes adhesive to flow outward from beneath the projections and collect in areas between the projections.

U.S. Pat. No. 4,659,405 to Walter teaches a lid and container seal wherein an incompressible rib is formed along the lip of the container. The lid has an adhesive layer that forms a seal with the rib, but the adhesive does not necessarily contact the flat portion of the lip, and no seal with the flat portion of the lip is formed. The rib is sealed to the lid with adhesive, and does not deform during sealing. The pressure applied in this sealing process is not great enough such that the rib pushes through the adhesive layer and comes into contact with the portion of the lid beneath the adhesive layer.

U.S. Pat. No. 4,961,513 to Gossedge et al. teaches a container with a lip having a plastic upper surface and a lid with a plastic lower surface. The lid and container lip are heat sealed together, forming two "ears" of material at the outer and inner edges of the seal. The "ears" consist of a plastic core formed of material from the lip which is joined to the lip by a thin "root," and an envelope encasing the core formed of material from the lid.

None of the prior art methods described above adequately overcome the problems of forming a consistent seal on a container, particularly when the container may contain overflow of product on the container lip. This problem, particularly acute when solid materials are to be placed in the container, will interfere with each of these sealing methods, resulting in a weak seal when material is present. What is desired is a method for sealing a peel-off lid on a container such that a tight seal is formed even when material may be present on the lip of the container during the sealing process.

SUMMARY OF THE INVENTION

The present invention overcomes the limitations of the prior art through a double sealing method to provide a consistent seal even when the lip of the container may be contaminated with overflow product. The container comprises a lid and a cup, with the cup having a lip with a raised sealing bead that runs along its length. The lid includes an adhesive layer on its lower side. The raised sealing bead is compressible, which allows a weld to form between the bead and the lid when the lid is pressed into place, while at the same time an adhesive seal is formed between the lid and the remaining portion of the lip. Thus the lid is sealed to the container both by the weld between the sealing bead and the lid, and by the adhesive bond between the lid and the remaining portion of the lip.

To attach the lid to the container according to the present invention, the lid is positioned over the cup and pressed into place while heat is applied. The heat causes the adhesive to bond the lip to the lid. The raised bead, however, will compress and deform under pressure, thereby stretching adhesive on the lid directly above the bead to either side of the bead, thus allowing the bead and lid to make direct contact. This direct contact is necessary for the weld to form. In addition, the smaller surface area of the bead with respect to the lid as a whole results in much greater pressure along the bead during sealing than would be experienced on the lip if no bead were used. Direct contact between the bead and lid under this high pressure causes the weld between the bead and lid, thereby forming an additional seal between the container and lid.

Any irregularities in the height or shape of the bead will be smoothed during the sealing process as a result of the bead's compressibility. If the lip of the container should become deformed such that the bead has a high point, that portion of the bead will be subject to correspondingly greater pressure during the sealing process. This higher pressure will cause the bead to compress further at the high point, thereby evening the height of the bead along its length automatically as sealing takes place. In a preferred embodiment, the bead has a relief pocket beneath it that increases the compressibility of the bead during the sealing process, enhancing the ability of the bead to stretch adhesive away from the lid to allow the weld to form, and increasing the capacity of the bead to even itself in height as a result of pressure during sealing.

This double sealing method is particularly well-suited to forming a seal when material has flowed onto the lip of the container. The direct weld between the bead and the lid is along a relatively small surface area of the lip, which reduces the likelihood that any material falling onto the lip would interfere with this bond. More importantly, however, the relatively high pressure between the bead and the lid during sealing will tend to force any material present on the bead to either side of the bead, thereby allowing a firm, solid seal to take place. This is particularly effective with respect to liquid or flowable materials that may have spilled onto the lid, since they may be pushed aside from the bead during sealing. Powders and granulated solids are also pushed aside by the process, thereby allowing a solid welded seal to form.

It is therefore an object of the invention to provide a container with a peel-off lid that has a reduced likelihood of leaking or spilling during shipment or storage.

It is a further object of the invention to provide a method for sealing a container with a peel-off lid that has a double seal between the lid and container lip.

It is a further object of the invention to provide a method for sealing a container that will seal when product is spilled onto the lip of the container prior to sealing.

It is a further object of the invention to provide a method for sealing a container with a sealing bead along its lip that will properly seal when the sealing bead has been warped or deformed prior to sealing.

Other objects of the invention will be evident from the description of the preferred embodiments of the invention and the drawings that follow.

BRIEF DESCRIPTION OF THE DRAWINGS

FIG. 3 is a cut-away view of the lip of a container according to a preferred embodiment of the present invention, showing a portion of the lid of the container positioned in place prior to sealing.

FIG. 4 is a cut-away view of the lip of a container according to a preferred embodiment of the present invention, showing a portion of the lid of the container after sealing.

FIG. 5 is a cut-away view of the lip of a container according to a preferred embodiment of the present invention, showing a portion of the lid of the container positioned in place prior to sealing when particles of product are present on the container lip.

FIG. 6 is a cut-away view of the lip of a container according to a preferred embodiment of the present invention, showing a portion of the lid of the container after sealing when particles of product are present on the container lip prior to sealing.

DETAILED DESCRIPTION OF THE PREFERRED EMBODIMENTS

Figure 1:
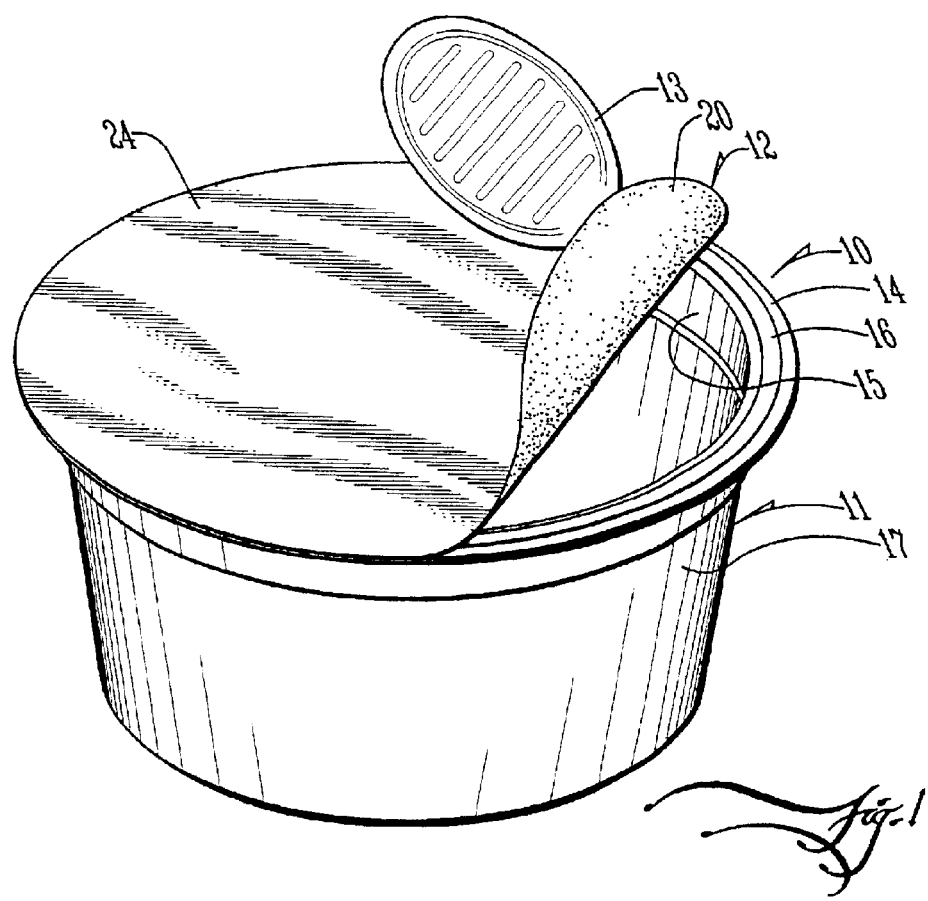
FIG. 1 is a perspective view of a container according to a preferred embodiment of the present invention, with the lid shown partially peeled away.
Figure 2:
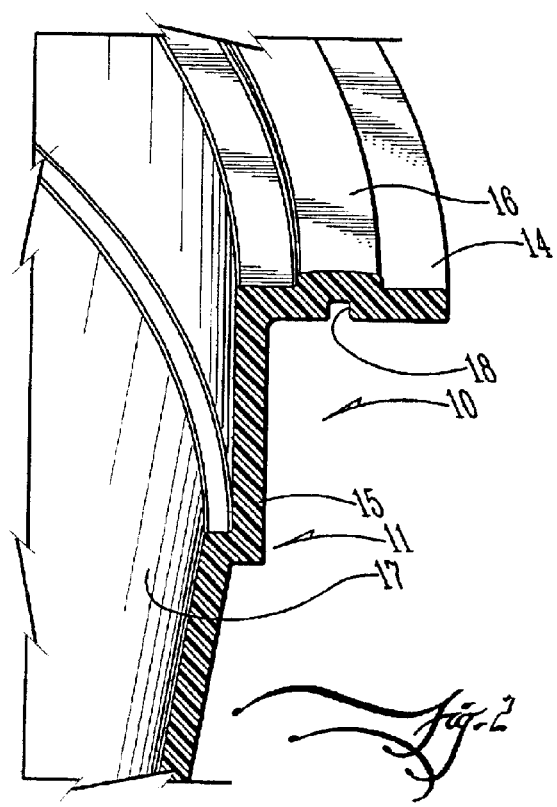
FIG. 2 is a cut-away view of the lip of a container according to a preferred embodiment of the present invention.

Referring now to FIGS. 1 and 2, a preferred embodiment of a container according to the present invention can be described. Container 10 is a portion cup constructed of cup 11 and lid 12. Container 10 is preferably formed of a plastic material, preferably high density polyethylene or polypropylene, but can be of any material of sufficient strength to protect the product within the cup. Cup 11 has an open top and is generally frustoconical in shape, but can be of any desired shape as appropriate for the product to be packaged and for the means of shipping and storing container 10, including cylindrical and rectangular shapes. In one preferred embodiment, using a cup 11 of inverted frustoconical shape designed to hold 1.25 fl. oz. of product, cup 11 has walls formed of high density polyethylene having a thickness of 0.017 inches, with a height of 1.135 inches and a 10° slope on its sides from the vertical. Also in a preferred embodiment, cup 11 has a cylindrical portion 15 that connects its frustoconical portion 17 to lip 14, cylindrical portion 15 having a height of 0.164 inches and an inside diameter of 2.169 inches.

Cup 11 has a lip 14 that extends transversely from the open top of cup 11 to which the periphery of lid 12 is sealed. Lip 14 must be of sufficient width to form a seal with lid 12 as described below. In a preferred embodiment of cup 11 designed to hold 1.25 oz. of product, lip 14 is annular and has a width of 0.115 inches.

Lid 12 is generally designed to match the size and shape of lip 14 for a smooth fit, but also includes a tab 13 that extends beyond lip 14 such that the user may grip tab 13 easily to open container 10. As shown in FIG. 1, container 10 has been partially opened by pulling tab 13 back across the open top of cup 11. Referring now to FIG. 3, the three layers of lid 12 are shown; the lower layer is adhesive layer 20, which is topped by a middle foil layer 22, followed by an outer paper layer 24. Paper layer 24 may preferably be constructed of C1S Stainless Paper, which is generally regarded as a "grease-proof" material. Outer paper layer 24 is preferably attached to middle foil layer 22 using LDPE or EEA adhesive as are known in the art. Middle foil layer 22 is preferably formed of a thickness in the range of 0.0005 to 0.001 inches, and may be formed of any alloy that provides a sufficient moisture barrier between outer paper layer 24 and the product within container 10. Adhesive layer 20 may preferably be formed in a film, which is attached to middle foil layer 22 with an LDPE adhesive or urethane adhesive. In the preferred embodiment, adhesive layer 20 is about 0.00125 inches thick.

Again referring to FIG. 1 and FIG. 2, raised sealing bead 16 runs the length of lip 14. In the preferred embodiment, sealing bead 16 has relief pocket 18 underneath it and running along its length. In this configuration, the wall thickness of lip 14 remains relatively constant instead of becoming thicker at sealing bead 16. In the preferred embodiment of container 10 designed to hold 1.25 oz. of product, sealing bead 16 may have a width of 0.050 inches and a height above lip 14 of 0.010 inches, and relief pocket 18 has a width of 0.014 inches and depth of 0.011 inches. Also in a preferred embodiment, sealing bead 16 is located approximately mid-way between the inner and outer edges of lip 14.

Referring now to FIGS. 3 and 4, the process for sealing lid 12 onto cup 11 according to a preferred embodiment of the invention is shown. Lid 12 is fed into place above cup 11 and aligned properly so that the outer edge of lid 12 will match the outer edge of lip 14 when sealing is complete. It should be noted that, as shown in FIG. 3, lid 12 must extend slightly from the edge of lip 14 prior to sealing because of the compression of sealing bead 16 as described below. The amount of offset in lid 12 and lip 14 necessary such that they will be properly positioned relative to one another after the seal is formed depends upon the width and height of sealing bead 16, as well as the thickness of the material used to form lip 14.

Once lid 12 is in place above lip 14, heater head 19 descends upon lid 12 as shown in FIG. 3. Heater head 19 applies both heat and pressure to lid 12 as well as to lip 14. In the preferred embodiment, heater head 19 is at a temperature of about 400 degrees Fahrenheit during sealing, and heater head 19 applies approximately 40 pounds per square inch of pressure to lid 12 for a duration of 0.5 seconds. Heat reaches lip 14 conductively through lid 12 from heater head 19. As shown in FIG. 3, when heater head 19 just touches lid 12, adhesive layer 20 of lid 12 is in contact with sealing bead 16 but is not in contact with the other portions of lip 14. Foil layer 22 is not in contact with either sealing bead 16 or lip 14.

As heater head 19 presses down upon lid 12, a large amount of pressure is placed upon sealing bead 16. This pressure is considerably greater than the pressure that would be effected upon lip 14 if sealing bead 16 were not present, because of the correspondingly lesser area occupied by the face of sealing bead 16 as compared to lip 14. This pressure causes sealing bead 16 to compress as shown in FIG. 4, thereby reducing the height of sealing bead 16 and increasing both the width of sealing bead 16 and lip 14. This pressure and deformation of sealing bead 16 also causes that portion of adhesive layer 20 directly above sealing bead 16 to "stretch" to the inside and outside of sealing bead 16. It should be noted that the heat from heater head 19 serves to activate adhesive layer 20, which partially liquefies adhesive layer 20 thereby furthering the "stretching" process.

Once the portion of adhesive layer 20 above sealing bead 16 is removed in this manner, sealing bead 16 and foil layer 22 of lid 12 come into direct contact. This direct contact further heats sealing bead 16, partially melting a portion of the top of sealing bead 16 and thereby welding it to lid 12 at foil layer 22. It should be noted that relief pocket 18 makes sealing bead 16 compressible at much lower pressures from heater head 19.

As shown in FIG. 4, the pressure of heater head 19 onto lid 12 also causes adhesive layer 20 of lid 12 to come into contact with lip 14. This forms an adhesive bond between lid 12 and lip 14 to the inside and outside of sealing bead 16. The result of this process is a double seal between cup 11 and lid 12; a welded seal between sealing bead 16 and foil layer 22, and an adhesive seal between lip 14 and adhesive layer 20.

Referring now to FIGS. 5 and 6, the sealing method described above is applied to the situation where particles of product 26 from cup 11 are present on lip 14. The high pressure present on top of sealing bead 16 as explained above, in addition to the compression of sealing bead 16 which creates a "stretching" effect on adhesive layer 20, combine to force particles 26 away from sealing bead 16 and toward one edge of lip 14. In the example of FIG. 6, one of particles 26 remains trapped between adhesive layer 20 and lip 14, thereby interfering with the adhesive seal between lid 12 and lip 14. If sealing, bead 16 were not present, the resulting seal might be insufficient to contain the product within container 10 during shipment and storage. But because sealing bead 16 has formed a weld with foil layer 22 of lid 12, container 10 is more likely to remain uncompromised even during rough handling or long storage after shipment. It should be noted that in the case of a particle 26 that is present on lip 14 near its inner or outer edge, the "stretching" effect on adhesive layer 20 is likely to push that particle 26 completely off of lip 14, thereby allowing a firm adhesive seal to take place between lid 12 and cup 11 in addition to the welded seal resulting from the use of sealing bead 16.

Referring again to FIG. 4, it will now be described how the present invention allows for automatic compensation when sealing bead 16 may be of uneven height. This may occur for a number of reasons, including warping of cup 11 due to temperature, rough handling of cup 11 prior to or during filling, or imprecise seating of cup 11 during the filling process. If certain points on sealing bead 16 are higher than others, then these points will first make contact with heater head 19 as it descends during the sealing process. Because only one point or a few points will be in contact with heater head 19, the pressure at these points will be very high, corresponding to the very small area over which the force of heater head 19 is spread. This very high pressure will serve to compress these points on sealing bead 16 to a greater extent than the lower portions, thereby resulting in a sealing bead 16 that is compressed to a roughly equal height at all points along its length at the completion of the sealing process. Because sealing bead 16 will be compressed to a relatively equal height at all points along its length, the resulting weld between sealing bead 16 and foil layer 22 of lid 12 will be of equal strength at all points along sealing bead 16, thereby maximizing the ability of container 10 to withstand rough handling or other environmental factors that might cause container 10 to otherwise leak or spill.

We claim:

1. A method of sealing a lid to a cup, said method comprising the steps of:
   (a) placing the lid over the cup, the cup comprising a lip with a raised sealing bead, and the lid comprising a lower adhesive layer and an upper layer; and
   (b) pressing the lid onto the lip of the cup, wherein the sealing bead is welded to the lid at said upper layer and the lip is adhered to the lid by said adhesive layer.

2. The method of claim 1, wherein said pressing step further comprises the step of applying heat to the lid.

3. The method of claim 1, wherein said pressing step further comprises the step of compressing the sealing bead.

4. The method of claim 3, wherein said pressing step further comprises the stretching of a portion of the adhesive layer directly above the sealing bead thereby allowing the sealing bead to weld to the upper layer.

5. The method of claim 4, wherein the cup further comprises a relief pocket beneath the sealing bead.

6. The method of claim 5, wherein the width of the sealing bead is between one-third and one-half of the width of the lip.

7. The method of claim 5, wherein the width of the sealing bead is about fifty thousandths of an inch.

8. The method of claim 7, wherein the width of the relief pocket is about fourteen thousandths of an inch.

9. The method of claim 5, wherein the shape of the cup is at least partially one of cylindrical and frustoconical.

10. The method of claim 9, wherein the lip, the sealing bead, and the relief pocket are annular.

* * * * *